(12) United States Patent
Bang et al.

(10) Patent No.: US 11,618,990 B2
(45) Date of Patent: Apr. 4, 2023

(54) DRYER

(71) Applicant: SAMSUNG ELECTRONICS CO., LTD., Suwon-si (KR)

(72) Inventors: Eun-suk Bang, Hwaseong-si (KR); Dong-pil Seo, Hwaseong-si (KR); Hyung-woo Lee, Suwon-si (KR); Sang-up Lee, Yongin-si (KR); Hwang-mook Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 371 days.

(21) Appl. No.: 16/651,442

(22) PCT Filed: Sep. 12, 2018

(86) PCT No.: PCT/KR2018/010656
§ 371 (c)(1),
(2) Date: Mar. 27, 2020

(87) PCT Pub. No.: WO2019/066316
PCT Pub. Date: Apr. 4, 2019

(65) Prior Publication Data
US 2020/0318281 A1 Oct. 8, 2020

(30) Foreign Application Priority Data
Sep. 27, 2017 (KR) .......................... 10-2017-0125242

(51) Int. Cl.
*D06F 58/02* (2006.01)
*B01D 46/00* (2022.01)
(Continued)

(52) U.S. Cl.
CPC .......... *D06F 58/02* (2013.01); *B01D 46/0009* (2013.01); *B01D 46/4227* (2013.01);
(Continued)

(58) Field of Classification Search
CPC .......... D06F 58/02; D06F 58/10; D06F 58/22; B01D 46/0009; B01D 46/4227
See application file for complete search history.

(56) References Cited

U.S. PATENT DOCUMENTS 7,707,858 B2    5/2010    Jeon et al.
8,868,243 B2    10/2014   Kim et al.
(Continued)

FOREIGN PATENT DOCUMENTS

CN    2212599 Y    11/1995
CN    1757816 A     4/2006
(Continued)

OTHER PUBLICATIONS

Office Action dated Jan. 24, 2022 issued in Korean Patent Application No. 10-2017-0125242.
(Continued)

*Primary Examiner* — Robert Clemente
(74) *Attorney, Agent, or Firm* — Staas & Halsey LLP

(57) ABSTRACT

A dryer is disclosed. The dryer comprises: a main body including an exhaust port; a first drying chamber disposed inside the main body such that hot air is supplied thereto; a second drying chamber disposed inside the main body such that hot air is supplied thereto; and an exhaust unit for guiding, to the exhaust port, air inside the first and second drying chambers, wherein the exhaust unit includes: a first exhaust path for connecting the first drying chamber and the exhaust port; a second exhaust path for connecting the second drying chamber and the first exhaust path; and a filter assembly separably coupled to the main body, and filtering the air passing through the first and second exhaust paths.

11 Claims, 7 Drawing Sheets

(51) Int. Cl.
*B01D 46/42* (2006.01)
*D06F 58/22* (2006.01)
*D06F 58/04* (2006.01)
*D06F 58/10* (2006.01)

(52) U.S. Cl.
CPC .............. *D06F 58/04* (2013.01); *D06F 58/22* (2013.01); *D06F 58/10* (2013.01)

(56) References Cited

U.S. PATENT DOCUMENTS

| | | | |
|---|---|---|---|
| 9,228,293 B2 | 1/2016 | Yeom | |
| 2006/0075790 A1 | 4/2006 | Jeon et al. | |
| 2007/0119072 A1 | 5/2007 | Kim | |
| 2008/0052950 A1* | 3/2008 | Park | D06F 39/125 34/524 |
| 2008/0053162 A1* | 3/2008 | Park | D06F 39/125 68/13 R |
| 2008/0053163 A1* | 3/2008 | Park | D06F 58/10 68/13 R |
| 2008/0053164 A1 | 3/2008 | Park et al. | |
| 2008/0053166 A1* | 3/2008 | Lim | D06F 58/10 68/5 C |
| 2008/0163651 A1* | 7/2008 | Jeong | D06F 58/10 68/5 C |
| 2008/0282745 A1* | 11/2008 | Han | D06F 58/203 68/20 |
| 2009/0193856 A1* | 8/2009 | Park | D06F 58/10 68/27 |
| 2009/0277036 A1* | 11/2009 | Lee | D06F 39/125 34/239 |
| 2009/0277037 A1* | 11/2009 | Lim | D06F 58/10 34/239 |
| 2010/0005681 A1* | 1/2010 | Jo | D06F 39/125 34/215 |
| 2010/0011609 A1* | 1/2010 | Park | D06F 29/00 34/88 |
| 2010/0281929 A1* | 11/2010 | Han | D06F 29/00 34/524 |
| 2011/0030428 A1* | 2/2011 | Han | D06F 29/00 68/5 R |
| 2012/0144687 A1 | 6/2012 | Yeom | |
| 2014/0238087 A1* | 8/2014 | Bae | D06F 29/005 68/27 |
| 2014/0238088 A1* | 8/2014 | Bae | D06F 29/005 68/27 |
| 2015/0337481 A1* | 11/2015 | Bae | D06F 39/125 34/245 |
| 2015/0337483 A1 | 11/2015 | Ramprasad et al. | |
| 2016/0258099 A1* | 9/2016 | Lee | D06F 31/00 |
| 2018/0179694 A1 | 6/2018 | Bang et al. | |

FOREIGN PATENT DOCUMENTS

| | | |
|---|---|---|
| CN | 101517147 A | 8/2009 |
| CN | 202519493 U | 11/2012 |
| JP | 2963811 | 10/1999 |
| JP | 2004-275488 A | 10/2004 |
| KR | 10-2004-0056807 | 7/2004 |
| KR | 10-2006-0004375 | 1/2006 |
| KR | 10-0652459 | 11/2006 |
| KR | 10-0677710 | 1/2007 |
| KR | 10-2007-0073144 | 7/2007 |
| KR | 10-2008-0010813 A | 1/2008 |
| KR | 10-2008-0020211 | 3/2008 |
| KR | 10-2012-0088466 | 8/2012 |
| KR | 10-2014-0114649 | 9/2014 |
| KR | 10-2018-0074402 | 7/2018 |

OTHER PUBLICATIONS

International Search Report dated Dec. 17, 2018, in corresponding International Application No. PCT/KR2018/010656.
Written Opinion of the International Searching Authority dated Dec. 17, 2018, in corresponding International Patent Application No. PCT/KR2018/010656.
Office Action dated Apr. 26, 2022, in Chinese Application No. 201880063008.9.

* cited by examiner

DRYER

CROSS-REFERENCE TO RELATED APPLICATIONS

This application is a U.S. National Stage Application which claims the benefit under 35 U.S.C. § 371 of International Patent Application No. PCT/KR2018/010656 filed on Sep. 12, 2018, which claims foreign priority benefit under 35 U.S.C. § 119 of Korean Patent Application No. 10-2017-0125242 filed on Sep. 27, 2017, in the Korean Intellectual Property Office, the contents of both of which are incorporated herein by reference.

TECHNICAL FIELD

The disclosure relates to a dryer.

BACKGROUND ART

In recent years, a dual type dryer including a plurality of drying chambers has emerged. This dual type dryer can separately perform drying on a dry subject put into each drying chamber provided separately thereto.

Such a dryer including the plurality of drying chambers may have increased drying performance and efficiency by allowing the plurality of drying chambers to simultaneously dry each dry subject depending on quantity and type of the dry subject.

However, a conventional dryer including the plurality of drying chambers may have a separate plurality of exhaust devices for externally exhausting high-temperature and high-humidity air after the drying in the plurality of drying chambers, respectively. Alternatively, another conventional dryer may not have a separate exhaust device for a small drying chamber including a smaller capacity, and have only an exhaust device capable of externally exhausting hot air of a large drying chamber.

DISCLOSURE

Technical Problem

A conventional dryer including exhaust devices respectively connected to a plurality of drying chambers may have an increased overall size of the dryer or a complicated internal structure due to the plurality of exhaust devices. In case of installing the dryer, additional work may be required for connecting a plurality of exhaust tubes to outsides of respective installation sites.

In addition, another conventional dryer including no separate exhaust device for a small drying chamber may have deteriorated drying performance because humid air after drying is accumulated in the drying chamber, or have a contaminated installation site because the installation site of the dryer is exposed to the humid air to cause mold and the like.

In addition, the conventional dryer including the plurality of drying chambers may include a plurality of filters for filtering contaminants such as dust or lint included in the air after the drying from the plurality of drying chambers, respectively. Alternatively, the another conventional dryer may not have a separate filter for the small drying chamber including a smaller capacity, and may have only a filter capable of filtering the air from a large drying chamber.

Therefore, the conventional dryer including the plurality of filters disposed at different positions may need separate management of replacing or cleaning each of the filters. In case of the another conventional dryer including no separate filter for the small drying chamber, a region around of the dryer may be contaminated with contaminants such as lint because air including the contaminants is exhausted from the small drying chamber to an outside of a main body as it is.

Technical Solution

The disclosure provides a dryer including improved exhaust performance and easy management.

According to an embodiment of the disclosure, a dryer may include: a main body including an exhaust port; a first drying chamber disposed inside the main body and supplied with hot air; a second drying chamber disposed inside the main body and supplied with hot air; and an exhaust unit configured to guide air inside the first and second drying chambers to the exhaust port, wherein the exhaust unit may include: a first exhaust path for connecting the first drying chamber with the exhaust port; a second exhaust path for connecting the second drying chamber with the first exhaust path; and a filter assembly detachably coupled to the main body and configured to filter air passing through the first and second exhaust paths.

The filter assembly may include fist and second filters detachably coupled to the first and second exhaust paths, respectively.

The first exhaust path may include a first filter receptacle including a first opening open to insert the first filter thereinto, the second exhaust path may include a second filter receptacle including a second opening open to insert the second filter thereinto, and the first filter receptacle and the second filter receptacle may be disposed close to each other.

The filter assembly may be detachably coupled to the main body and may further include a filter tray configured to support the first and second filters.

The main body may include a filter tray receptacle connected to the first and second openings and open to insert the filter tray thereinto.

The first and second openings may be open in the same direction and the filter tray may be coupled to the main body and close the first and second openings.

The filter tray may include a gripper detachably coupled to the filter tray receptacle and first and second frames coupled to the gripper and configured to support the first and second filters, respectively, and in case that the filter tray is coupled to the main body, the first and second frames may be inserted to the first and second filter receptacles through the first and second openings, respectively.

The first exhaust path may include a first upstream duct for connecting an outlet of the first drying chamber with the first filter receptacle and a first downstream duct for connecting the first filter receptacle with the exhaust port; the second exhaust path may include a second upstream duct for connecting an outlet of the second drying chamber with the second filter receptacle and a second downstream duct for connecting the second filter receptacle with the first downstream duct; and the first and second filters may be inserted into the first and second filter receptacles, respectively, to be connected to the first and second upstream ducts, respectively.

The first and second filter receptacles and the first and second downstream ducts may be disposed between the first drying chamber and the second drying chamber.

The first and second filter receptacles may be disposed close to a front surface of the main body, and the filter tray receptacle may be open toward a front side of the main body.

The first drying chamber may be larger than the second drying chamber, and a diameter of the first exhaust path may be larger than that of the second exhaust path.

The first exhaust path may include a venturi tube, and the second exhaust path may be connected to the venturi tube.

The venturi tube may include a first portion including a gradually decreased diameter, a second portion connected to the first portion and a third portion including a diameter gradually increased from a diameter of the second portion, and the second exhaust path may be connected to the third portion.

The first exhaust path may include a damper disposed upstream of the first exhaust path than the venturi tube to selectively open and close the first exhaust path.

The damper may be a check damper opened in only a direction from the first drying chamber toward the exhaust port by being pressurized by the air moved from the first drying chamber toward the exhaust port to prevent the air moved along the first exhaust path from flowing back to the first drying chamber.

The first and second filter receptacles may be disposed upstream than a portion where the first exhaust path and the second exhaust path are connected to each other.

In addition, according to another embodiment of the disclosure, a dryer may include: a main body forming an appearance of the dryer and including an exhaust port; a drying drum including a first drying chamber rotatably disposed inside the main body and supplied with hot air; a drying chamber including a second drying chamber disposed above the drying drum and supplied with hot air; a hot air supplier configured to supply hot air to insides of the drying drum and the drying chamber, separately; and an exhaust unit configured to guide air inside the drying drum and the drying chamber to the exhaust port, wherein the exhaust port may include: a first exhaust path connecting the first drying chamber with the exhaust port and including a first filter receptacle; a second exhaust path connecting the second drying chamber with the first exhaust path and including a second filter receptacle disposed close to the first filter receptacle; and a filter assembly detachably coupled to the main body and including first and second filters coupled to the first and second filter receptacles to filter air passing through the first and second exhaust paths, respectively.

BEST MODE

Figure 1:
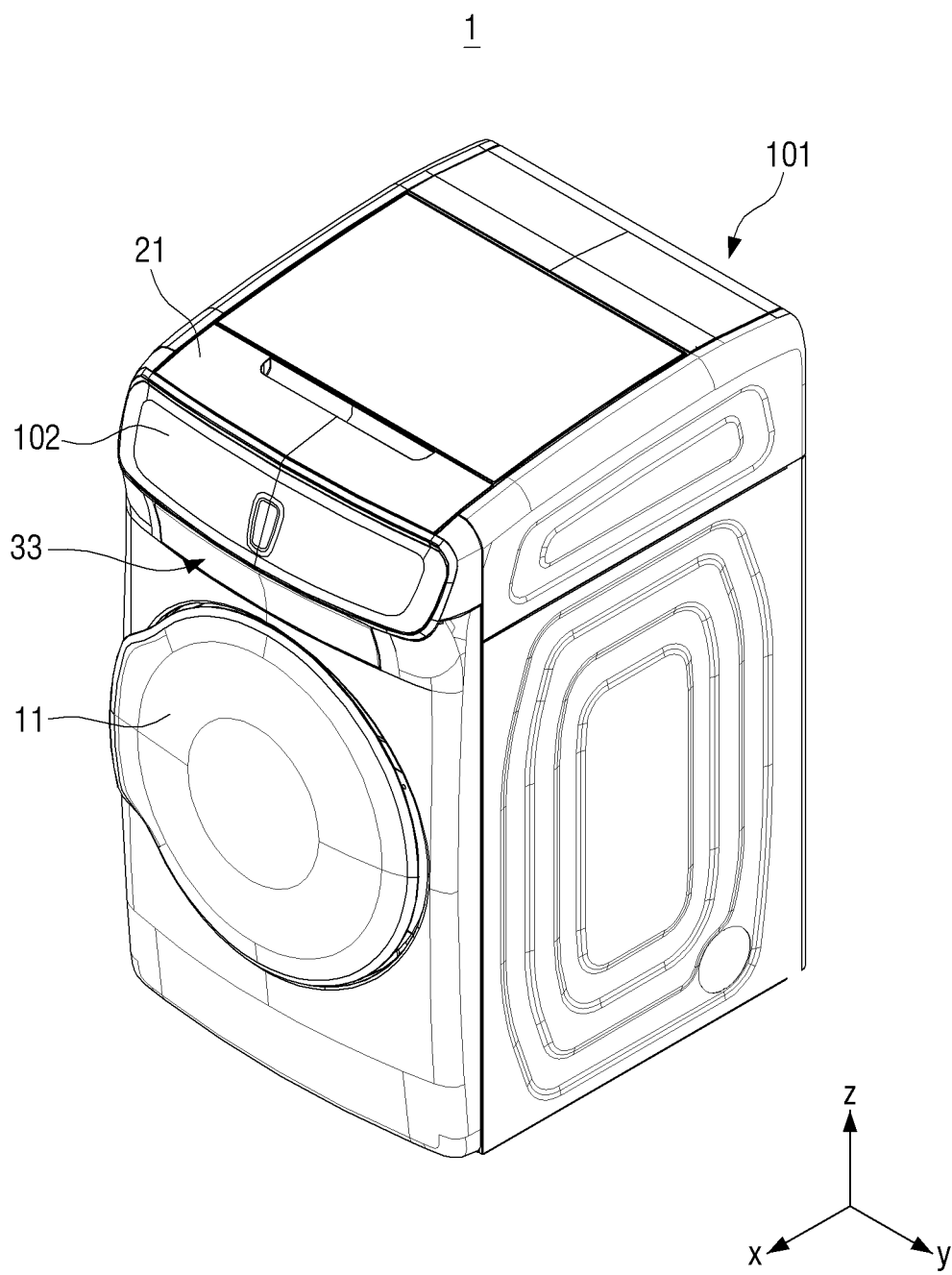
FIG. 1 is a perspective view showing a dryer according to an embodiment of the disclosure.

Hereinafter, various embodiments of the disclosure are described in detail with reference to the accompanying drawings. Embodiments to be described below are described on a basis of embodiments most appropriate for understanding technical features of the disclosure, and these embodiments do not limit the technical features of the disclosure, but exemplify that the disclosure may be implemented like these embodiments.

Therefore, the disclosure may be variously modified without departing from the technical scope of the disclosure through embodiments to be described below, and these modifications are to fall within the technical scope of the disclosure. In addition, to assist in the understanding of embodiments to be described below, related components among components performing the same operations in the respective embodiments are denoted by the same or similar reference numerals throughout the accompanying drawings. In addition, the accompanying drawings are not illustrated to scale, but sizes of some of components may be exaggerated to assist in the understanding of the disclosure.

Figure 2:
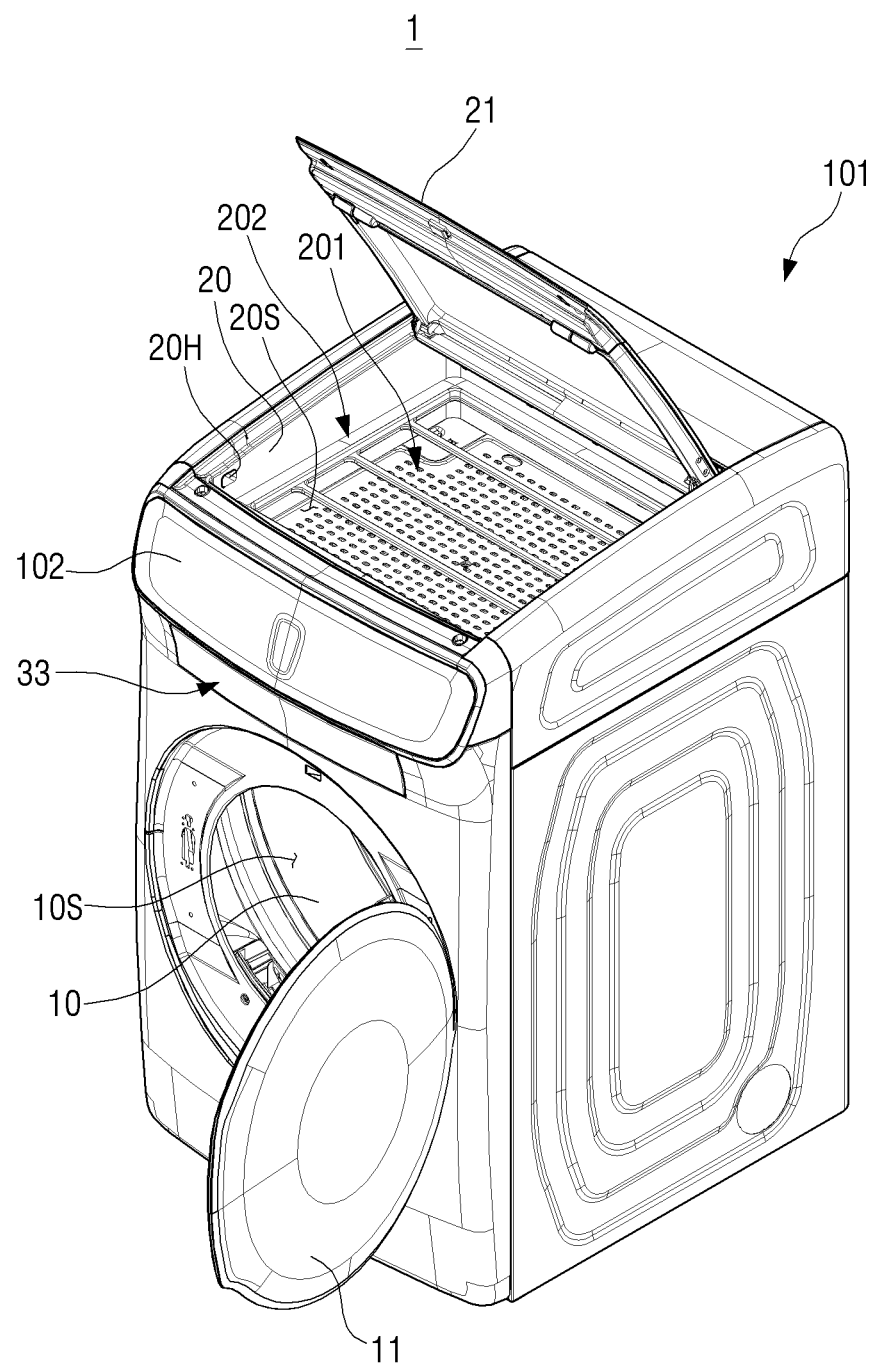
FIG. 2 is a perspective view showing an opened state of first and second doors of the dryer according to an embodiment of the disclosure.

FIG. 1 is a perspective view showing a dryer 1 according to an embodiment of the disclosure; and FIG. 2 is a perspective view showing an opened state of first and second doors 11 and 21 of the dryer according to an embodiment of the disclosure.

The dryer 1 described below is a device for drying a dry subject by supplying high-temperature dry hot air to a drying chamber accommodating the dry subject. Here, the dry subject may refer to any subject that can be dried by hot air. For example, the dry subject may refer to any subject implemented with various types of fibers and fabrics, such as clothing and a towel, and is not limited thereto.

As shown in FIG. 1, the dryer 1 may include a main body 101 forming its appearance. The main body 101 may have a shape of a rectangular parallelepiped extending in a vertical direction.

Hereinafter, for convenience of description, the description describes the following directions based on the dryer 1 shown in FIG. 1: a front side indicates a side (X-axis direction) in which a first door 11 is installed; a rear side indicates a direction opposite to the front side; and both sides (Y-axis direction) and top and bottom sides (Z-axis directions) are defined based on the front side.

The main body 101 may include the first door 11 coupled to a front surface of the main body 101 and a second door 21 coupled to a top surface of the main body 101.

The first door 11 may be hinged to the front surface of the main body 101 to be pivotally opened toward the front side of the main body 101, and the second door 21 may be hinged to the top surface of the main body 101 to be pivotally opened toward a top side of the main body 101.

A drying drum 10 including a first drying chamber 10S supplied with hot air may be rotatably disposed inside the main body 101, and a drying chamber 20 including a second drying chamber 20S supplied with hot air may be disposed above the drying drum 10.

The drying drum 10 may have a shape of a cylinder open toward the front side, be opened and closed by the first door 11, and through which the first drying chamber 10S may be opened and closed.

In addition, the drying chamber 20 may have a shape of a hexahedral basket open toward the top side, and may be opened and closed by the second door 21, and through which the second drying chamber 20S may be opened and closed.

A user may open the first door 11 and put the dry subject into an inside of the first drying chamber 10S and the dry subject put into the first drying chamber 10S may be dried by rotating the drying drum 10 supplied with hot air.

In addition, the user may open the second door 21 to put the dry subject into the second drying chamber 20S, and the dry subject put into the second drying chamber 20S may be dried by hot air supplied to the drying chamber 20.

As shown in FIG. 2, a cover shelf 201 and a drying rack 202 may be disposed inside the drying chamber 20.

The cover shelf 201 may have a shape of a plate disposed facing a bottom surface of the drying chamber 20 and may include a plurality of through holes.

The cover shelf 201 may guide (spray) hot air introduced between the bottom surface of the drying chamber 20 and the cover shelf 201 to a top side of the cover shelf 201 through the plurality of through holes, and may guide hot air to be uniformly circulated inside the second drying chamber 20S.

In addition, the drying rack 202 on which the dry subject may be mounted may be detachably disposed on the top side of the cover shelf 201.

The drying rack 202 may have a grill structure to be disposed facing the cover shelf 201, and the dry subject may be mounted on the drying rack 202 to be spaced apart from the cover shelf 201 by a predetermined distance.

Therefore, the dry subject mounted on the drying rack 202 may be easily dried by hot air moved from the through holes of the cover shelf 201 toward the top side.

The drying drum 10 including the first drying chamber 10S may be larger in size than the drying chamber 20 including the second drying chamber 20S.

Therefore, the first drying chamber 10S may be larger in size than the second drying chamber 20S, and the first drying chamber 10S may have larger capacity of the dry subject that can be dried for each time than the second drying chamber 20S.

Therefore, the drying may be selectively performed either in the first drying chamber 10S or in the second drying chamber 20S depending on quantity and type of the dry subject.

The dryer 1 described above may perform drying of a large amount of the dry subject by rotating drying drum 10, and may perform drying of delicate clothing made of a material easily damaged by external force and heat (for example, wool knit, baby clothing or the like) or a small amount of the dry subject by the drying chamber 20. In this manner, the dryer 1 may perform effective drying depending on the quantity and type of the dry subject.

A control panel 102 may be disposed on the front surface of the main body 101.

The control panel 102 may be disposed above the first door 11 to be easily operated by the user.

The control panel 102 may include an operator enabling the user to input an operation instruction for operating the dryer 1 and a display displaying operation information of the dryer 1.

The operator may include a plurality of buttons or control dials, and the user may thus select an operation mode of the dryer 1 using the operator.

The display may display the operation information of the dryer 1 as a visual image. In addition, the display may further include a plurality of buttons for obtaining the user's operation instruction, and may be configured as a touch screen.

In addition, a processor (not shown) for controlling the dryer 1 may be disposed inside the control panel 102.

Figure 3:
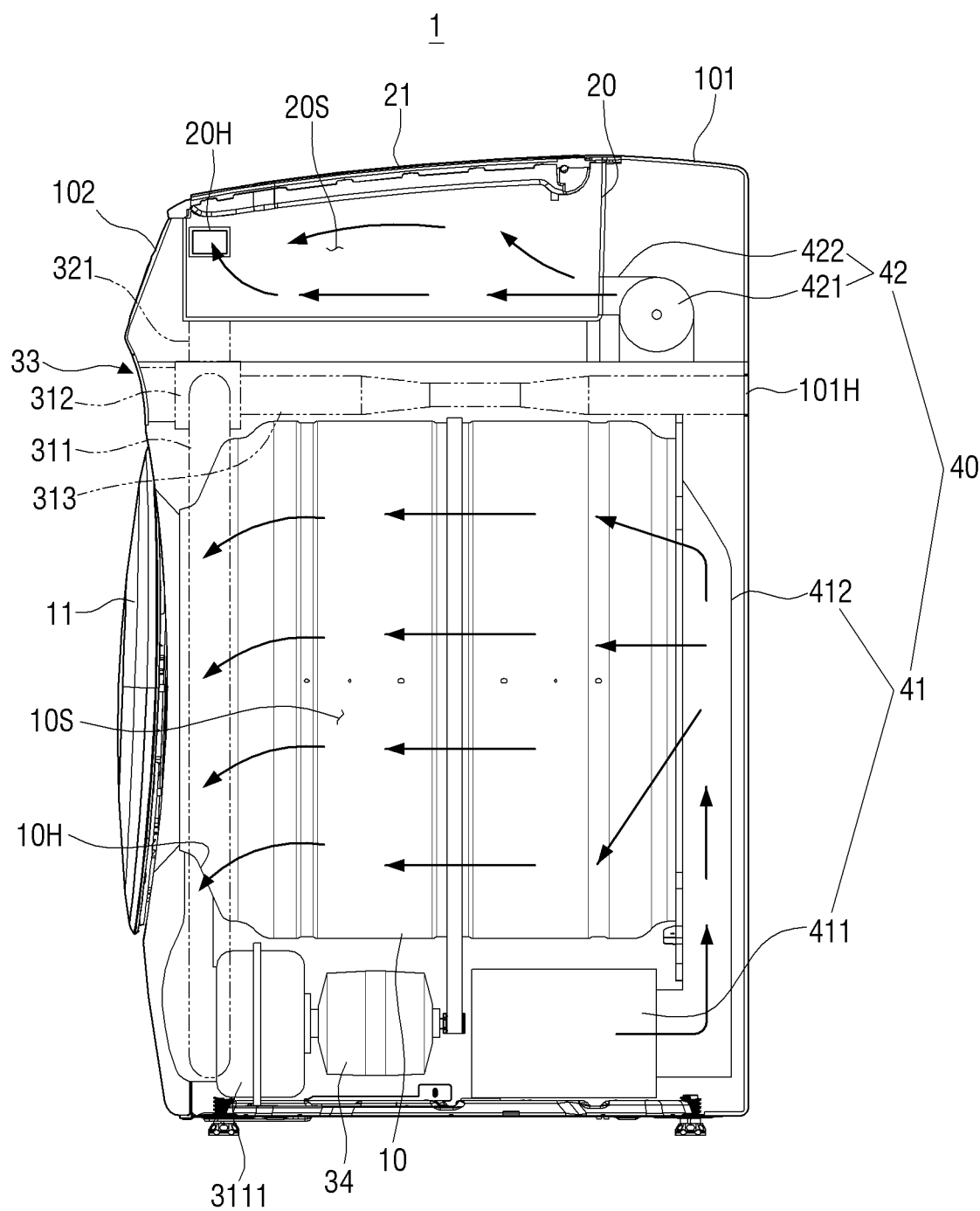
FIG. 3 is a side view schematically showing an inside of the dryer according to an embodiment of the disclosure.

FIG. 3 is a side view schematically showing an inside of the dryer 1 according to an embodiment of the disclosure.

Hereinafter, referring to FIG. 3, the description focuses on a structure in which hot air is supplied to the first and second drying chambers 10S and 20S for drying the dry subject.

For convenience of description, FIG. 3 uses arrows to indicate flows of hot air respectively introduced into the first and second drying chambers 10S and 20S.

The drying drum 10 may be disposed in a horizontal direction with respect to an installation surface of the main body 101, and may have a shape of a cylinder rotating about a rotation center disposed in the horizontal direction.

In addition, the drying drum 10 may have the rotation center formed in a front and rear horizontal direction, and may include an inlet open toward the front side of the main body 101 to allow the dry subject to be put into the inside of the drying drum.

The drying drum 10 may be disposed inside the main body 101 and rotated by a rotational force of a driving roller (not shown) in contact with an outer circumferential surface of the drying drum 10. In this manner, the drying drum 10 may uniformly apply hot air to the dry subject put into the first drying chamber 10S.

As described above, the first door 11 may be coupled to the front surface of the main body 101 to open and close the inlet of the drying drum 10.

The first door 11 may be pivotally coupled to the front surface of the main body 101 to open and close the first drying chamber 10S.

Therefore, the dry subject may be put into the first drying chamber 10S of the drying drum 10 by opening the first door 11.

A hot air supplier 40 may be disposed inside the main body 101 to supply hot air into the drying drum 10 and the inside of the drying chamber 20.

The hot air supplier 40 may supply hot air drying the dry subject to the first and second drying chambers 10S and 20S, respectively.

In detail, the hot air supplier 40 may include a first hot air unit 41 and a second hot air unit 42.

The first hot air unit 41 may be connected to the drying drum 10 to supply hot air to the first drying chamber 10S, and may include a first heater 411, which is disposed below the drying drum 10, and a first hot air duct 412.

The first heater 411 may include a first heating member (not shown) and a first blowing fan (not shown) for blowing air heated by the first heating member to the first hot air duct 412. Air heated by the first heating member may be moved to the first drying chamber 10S past through the first hot air duct 412 by the first blowing fan.

The first hot air duct 412 may be configured as a tube connecting the drying drum 10 with the first heater 411, and may be connected to a rear portion of the drying drum 10 opposite to the inlet open toward the front side of the drying drum 10.

Therefore, hot air provided from the first heater 411 may be introduced into the first drying chamber 10S of the drying drum 10 past through the first hot air duct 412.

The first heating member may be configured as an electric heater providing hot air using electric resistance heat of a coil, or may be configured as a gas heater providing hot air using combustion heat of gas.

The second hot air unit 42 connected to the drying chamber 20 and supplying hot air to the second drying chamber 20S may be disposed behind the drying chamber 20.

The second hot air unit 42 may be connected to the drying chamber 20 to supply hot air to the second drying chamber 20S, and may include a second heater 421 and a second hot air duct 422, which are disposed behind the drying chamber 20.

The second heater 421 may include a second heating member (not shown) and a second blowing fan (not shown) for blowing air heated by the second heating member to the second hot air duct 422. Therefore, air heated by the second heating member may be moved to the second drying chamber 20S past through the second hot air duct 422 by the second blowing fan.

Accordingly, hot air provided from the second heater 421 may be introduced into the second drying chamber 20S of the drying chamber 20 past through the second hot air duct 422.

The second heating member may be configured as the electric heater providing hot air using the electric resistance heat of the coil, or may be configured as the gas heater providing hot air using the combustion heat of the gas.

As described above, the second drying chamber 20S may be smaller in size and capacity than the first drying chamber 10S, and thus the second hot air unit 42 may be smaller in size than the first hot air unit 41.

In addition, the first and second hot air units 41 and 42 respectively connected to the drying drum 10 and the drying chamber 20 may be integrally configured as a single hot air unit, and may selectively supply hot air to at least one of the first drying chamber 10S or the second drying chamber 20S through a separate damper.

However, a more detailed description thereof is omitted because the first and second hot air units 41 and 42 are identical or similar to those of the related art.

The main body 101 may have an exhaust port 101H formed at its one side. As shown in FIG. 3, the exhaust port 101H may be formed on a rear surface of the main body 101.

In addition, an exhaust unit 30 (see FIG. 4) may be disposed inside the main body 101 for guiding air inside the drying drum 10 and the drying chamber 20 to the exhaust port 101H.

Hot air (i.e. air, hereinafter, hot air and air are used together for convenience of description) including a large amount of humidity after drying the dry subject in the first and second drying chambers 10S and 20S may be exhausted to the exhaust port 101H through the exhaust unit 30.

A specific structure of the exhaust unit 30 is described below.

Figure 4:
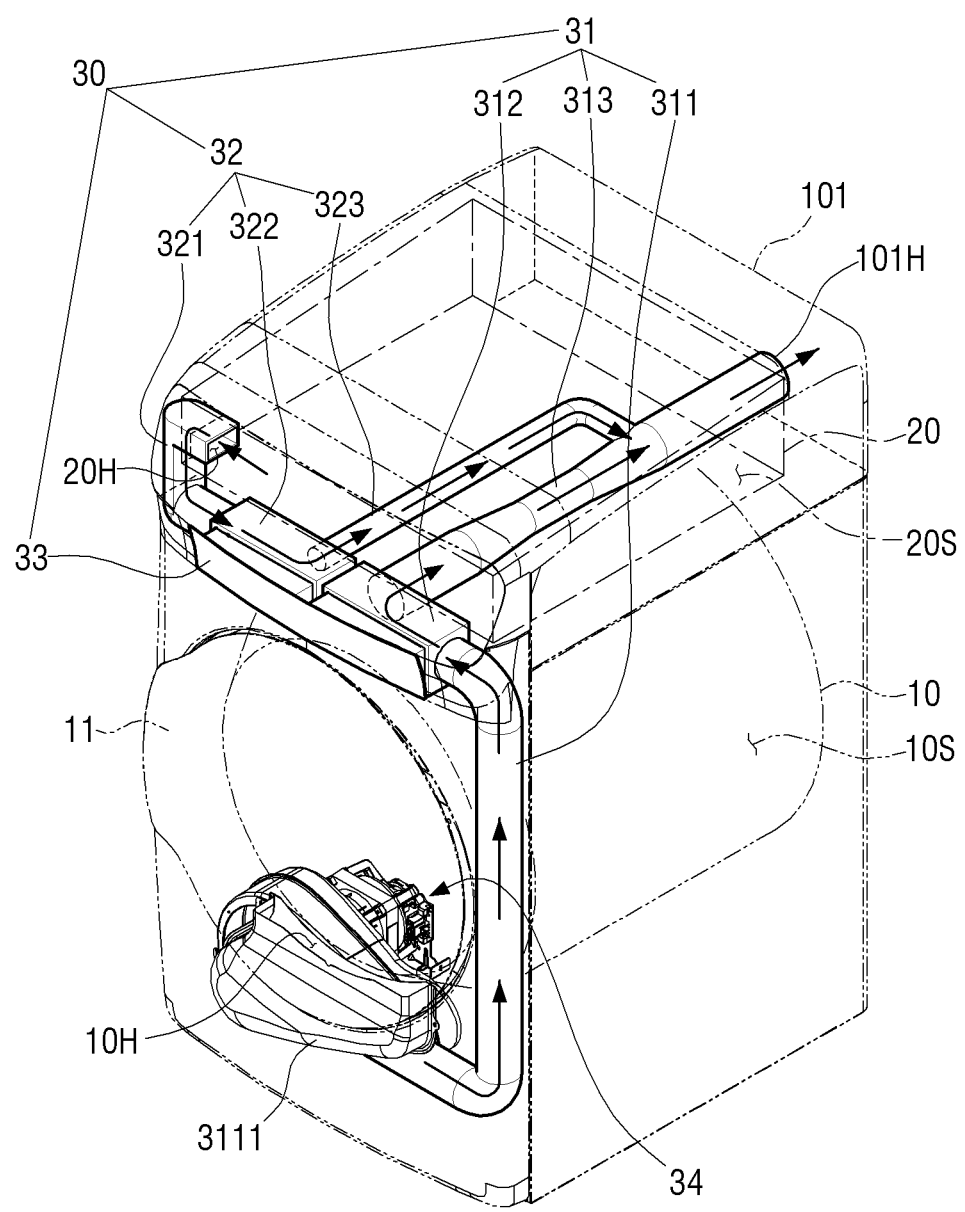
FIGS. 4 and 5 are perspective and front views showing an exhaust unit disposed inside the dryer according to an embodiment of the disclosure.
Figure 5:
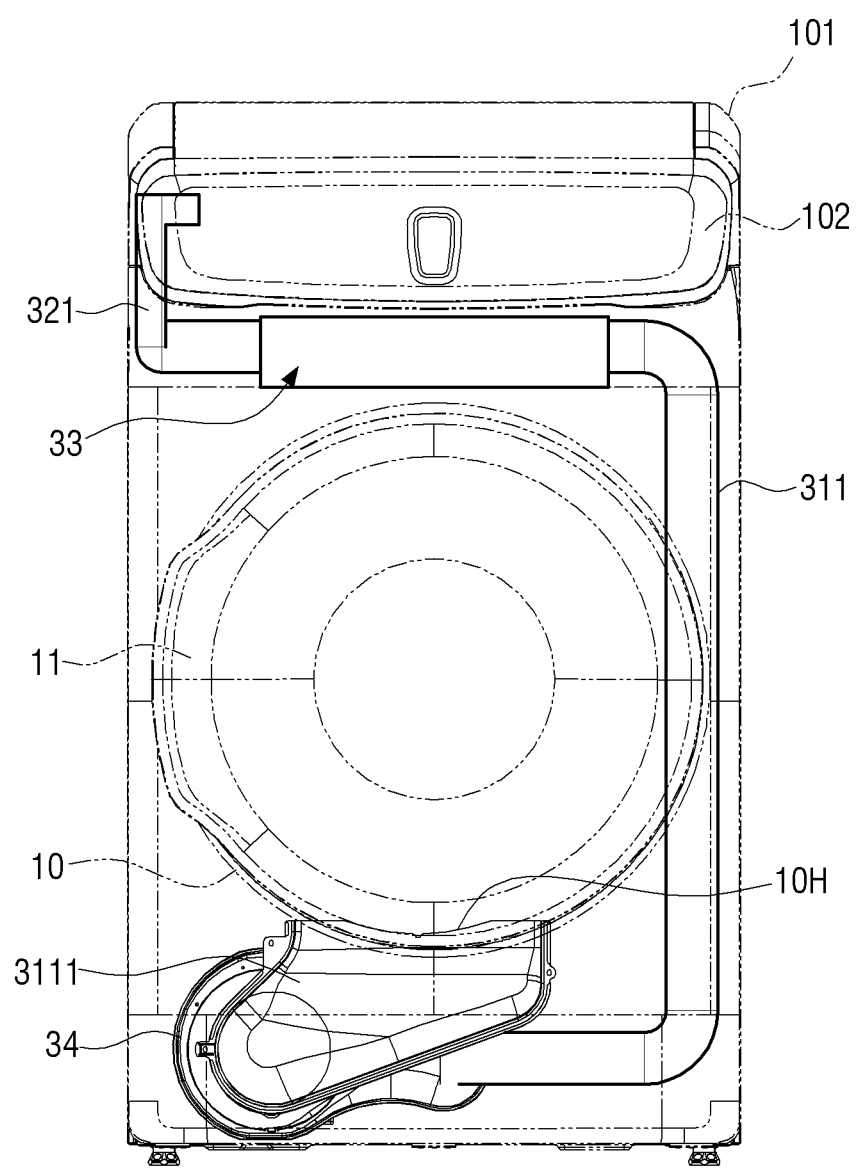
Figure 6:
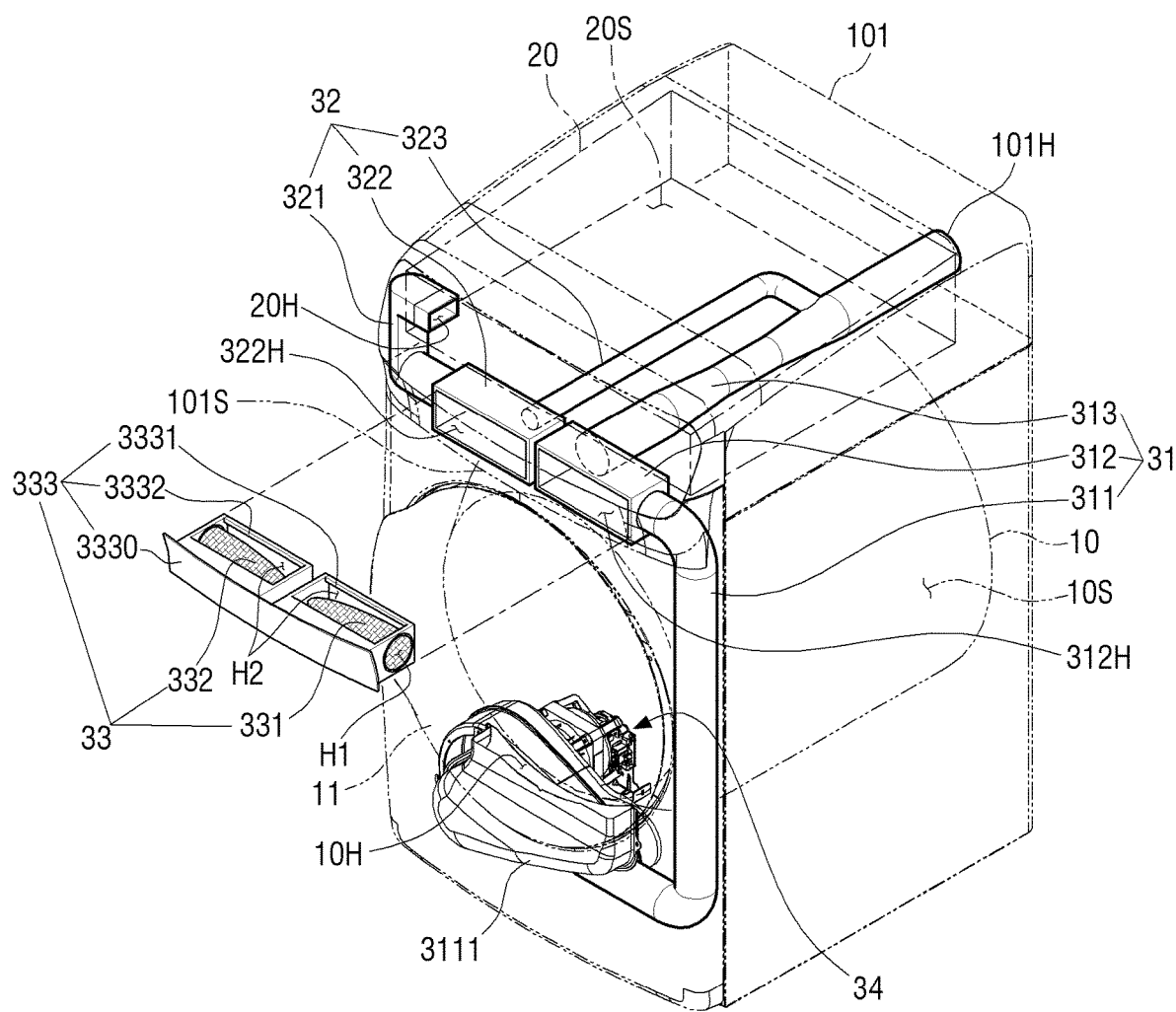
FIG. 6 is a perspective view showing a detached state of a filter assembly of the dryer according to an embodiment of the disclosure is detached from a main body.

FIG. 4 is a perspective view showing an inside of the dryer 1 according to an embodiment of the disclosure centered on an exhaust unit 30; FIG. 5 is a front view showing the inside of the dryer 1 according to an embodiment of the disclosure centered on the exhaust unit 30; and FIG. 6 is a perspective view showing a state in which a filter assembly of the dryer according to an embodiment of the disclosure is detached from a main body.

Hereinafter, a specific structure of the exhaust unit 30 is described in detail with reference to FIGS. 3 through 6.

For convenience of description, FIG. 4 uses arrows to indicate flows of air respectively exhausted from the first and second drying chambers 10S and 20S through the exhaust unit 30 to the exhaust port 101H.

The exhaust unit 30 may include a first exhaust path 31, a second exhaust path 32, a filter assembly 33 and an exhaust fan 34.

The first exhaust path 31 may connect the first drying chamber 10S with the exhaust port 101H, through which humid air after the drying in the first drying chamber 10S may be guided to the exhaust port 101H through the first exhaust path 31.

The second exhaust path 32 may connect the second drying chamber 20S with the first exhaust path 31, through which humid air after the drying in the second drying chamber 20S may be guided to first exhaust path 31 and air moved to the first exhaust path 31 through the second exhaust path 32 may be exhausted an outside of the main body 101 through the exhaust port 101H.

To this end, a diameter of the first exhaust path 31 may be larger than that of the second exhaust path 32.

As such, the second exhaust path 32 may be connected to the first exhaust path 31 to guide the air inside the second drying chamber 20S to the first exhaust path 31, and may guide the air inside the second drying chamber 20S to the exhaust port 101H through the first exhaust path 31.

Accordingly, in the exhaust unit 30 of the disclosure, the first exhaust path 31 and the second exhaust path 32 may be connected to each other, enabling that the air inside the first and second drying chambers 10S and 20S is guided to the outside of the main body 10 through the single exhaust port 101H. Therefore, the humid air after the drying in each of the first and second drying chambers 10S and 20S may be easily exhausted through the single exhaust port 101H.

The description below more specifically focuses on a structure in which the first and second exhaust paths 31 and 32 are connected to each other.

The filter assembly 33 may be detachably coupled to the main body 101, and may filter and purify air passing through the first and second exhaust paths 31 and 32.

Air after the drying in the first and second drying chambers 10S and 20S may include contaminants such as dust, lint and the like, occurring during the drying of the dry subject.

Accordingly, by filtering the air passing through the first and second exhaust paths 31 and 32 using the filter assembly 33, the air passing through the exhaust port 101H can be exhausted in a clean state free of such contaminants as dust and lint.

In detail, the filter assembly 33 may include first and second filters 331 and 332 which are detachably coupled to the first and second exhaust paths 31 and 32, respectively.

The first exhaust path 31 may include a first upstream duct 311, a first filter receptacle 312 and a first downstream duct 313.

The first upstream duct 311 may have one end connected with the first drying chamber 10S and the other end connected with the first filter receptacle 312, and the first downstream duct 313 may have one end connected with the first filter receptacle 312 and the other end connected to the exhaust port 101H.

Accordingly, the first upstream duct 311 may connect the first drying chamber 10S with the first filter receptacle 312, and the first downstream duct 313 may connect the first filter receptacle 312 with the exhaust port 101H.

The first filter receptacle 312 may be a point where the first upstream duct 311 and the first downstream duct 313 are connected to each other, and may include a first opening 312H open to insert the first filter 331 thereinto.

In addition, the first upstream duct 311 may be directly connected to the first drying chamber 10S, but may be connected to the first drying chamber 10S through a connection duct 3111 by further including the connection duct 3111 disposed close to the inlet of the drying drum 10.

The connection duct 3111 may be disposed close to a lower side of the inlet of the drying drum 10.

The connection duct 3111 may include a first outlet 10H configured of a plurality of through holes arranged close to the inlet of the drying drum 10.

Therefore, the air inside the first drying chamber 10S may be introduced into the connection duct 3111 through the first outlet 10H, and the hot air moved to the connection duct 3111 may be exhausted to the exhaust port 101H by sequentially passing through the first upstream duct 311, the first filter receptacle 312 and the first downstream duct 313.

In addition, the exhaust fan 34 may be coupled to the connection duct 3111.

The exhaust fan 34 may include a suction blade (not shown) and a drive motor (not shown) for rotating the suction blade, and as the suction blade is rotated, hot air inside the first drying chamber 10S may be sucked into the connection duct 3111 through the first outlet 10H.

In addition, the hot air sucked into the connection duct 3111 may be easily moved along the first upstream duct 311, the first filter receptacle 312 and the first downstream duct 313 by the exhaust fan 34, and through which the hot air may be easily exhausted to the exhaust port 101H.

However, in addition to the above-described structure, the first outlet 10H may be directly formed on the first upstream duct 311, or may be formed on the drying drum 10 and connected to the first upstream duct 311.

The second exhaust path 32 may include a second upstream duct 321, a second filter receptacle 322 and a second downstream duct 323.

The second upstream duct 321 may have one end connected with the second drying chamber 20S and the other end connected with the second filter receptacle 322, and the second downstream duct 323 may have one end connected with the second filter receptacle 322 and the other end connected to the first downstream duct 313.

Accordingly, the second upstream duct 321 may connect the second drying chamber 20S with the second filter receptacle 322, and the second downstream duct 323 may connect the second filter receptacle 322 with the first downstream duct 313.

The second filter receptacle 322 may connect the second upstream duct 321 with the second downstream duct 323, and may include a second opening 322H open to insert the second filter 332 thereinto.

The drying chamber 20 may include a second outlet 20H formed at its one side, and one end of the second upstream duct 321 may be connected to the second outlet 20H.

As an example, the second outlet 20H may be formed on a portion of the side of the drying chamber 20, which is close to the front surface of the drying chamber 20.

Therefore, the air inside the second drying chamber 20S may be introduced into the second upstream duct 321 through the second outlet 20H, and the hot air moved to the second upstream duct 321 may be moved to the first downstream duct 313 by sequentially passing through the second filter receptacle 322 and the second downstream duct 323.

The air moved from the inside of the second drying chamber 20S to the first downstream duct 313 may be exhausted to the outside through the exhaust port 101H.

The second drying chamber 20S may be smaller in size than the first drying chamber 10S, and thus an amount of hot air introduced into the second drying chamber 20S through the second hot air unit 42 may be smaller than that of hot air supplied to the first drying chamber 10S.

Accordingly, the second exhaust path 32 may introduce the air inside the second drying chamber 20S into the second upstream duct 321 through the second outlet 20H without a separate exhaust fan connected thereto.

Alternatively, the second exhaust path 32 may be connected to the separate exhaust fan (not shown), and the air inside the second drying chamber 20S may thus be easily sucked through the second outlet 20H.

As shown in FIGS. 4 through 6, the first filter receptacle 312 and the second filter receptacle 322 may be disposed close to each other, and disposed close to the front surface of the main body 101.

In addition, the first and second filter receptacles 312 and 322 and the first and second downstream ducts 313 and 323 may be disposed between the first drying chamber 10S and the second drying chamber 20S.

In addition, the first downstream duct 313 and the second downstream duct 323 may also be disposed close to each other, and may be connected to each other at a portion close to the exhaust port 101H.

In detail, the first and second filter receptacles 312 and 322 may be disposed above the inlet of the drying drum 10 and below the front surface of the drying chamber 20.

Accordingly, the first upstream duct 311 may have a shape extending up and down in such a manner that one end of the first upstream duct 311 is connected to the first outlet 10H through the connection duct 3111 disposed below the inlet of the drying drum 10, and the other end of the first upstream duct 311 is connected to the first filter receptacle 312. The first upstream duct 311 may have at least one bent portion, and may have a minimized length by being disposed close to the front surface of the main body 101.

In addition, the exhaust port 101H of the main body 101 may be formed at the rear surface of the main body 101, and the first downstream duct 313 may thus extend rearward from the first filter receptacle 312 disposed close to the front surface of the main body 101 toward the exhaust port 101H of the main body 101.

In addition, the second upstream duct 321 may have a shape extending up and down in such a manner that one end of the second upstream duct 321 is connected to the second outlet 20H formed at the side of the drying chamber 20 and the other end of the second upstream duct 321 is connected to the second filter receptacle 322. The second upstream duct 321 may have at least one bent portion, and may have a minimized length by being disposed close to the front surface of the main body 101.

In addition, the second downstream duct 323 may be connected to the second filter receptacle 322 to extend toward the rear surface of the main body 101, and may be connected to the first downstream duct 313 by including the other end bent toward the first downstream duct 313.

The first and second filter receptacles 312 and 322 may be disposed upstream than a portion where the first exhaust path 31 and the second exhaust path 32 are connected to each other. In this manner, air exhausted from the first and second drying chambers 10S and 20S may pass through the first and second filter receptacles before passing through the first and second downstream ducts 313 and 323.

The above-described dispositions and structures of the first and second upstream ducts 311 and 321, the first and second filter receptacles 312 and 322 and the first and second downstream ducts 313 and 323 may be variously changed depending on those of the drying drum 10, the drying chamber 20 and the exhaust port 101H, and the first and second exhaust paths 31 and 32 need to have minimized overall lengths.

The filter assembly 33 may be detachably coupled to the main body 101 and include a filter tray 333 supporting the first and second filters 331 and 332. Accordingly, the first and second filters 331 and 332 may be moved together by the filter tray 333 in case that the filter assembly 33 is inserted into and taken out of the main body 101. Therefore, the user may manage the first and second filters 331 and 332 together with the filter tray without separately managing the first and second filters 331 and 332.

In addition, the main body 101 may include a filter tray receptacle 101S connected to the first and second openings 312H and 322H of the first and second filter receptacles 312 and 322 and open toward the front side of the main body to insert the filter tray 333 thereinto.

In detail, the filter tray 333 may include a gripper 3330 and first and second frames 3331 and 3332, which are coupled to the gripper 3330.

The first and second filters 331 and 332 may be disposed inside the first and second frames 3331 and 3332, and the first and second frames 3331 and 3332 may be coupled to the gripper 3330 to support the first and second filters 331 and 332, respectively.

The first and second frames 3331 and 3332 may include first openings H1 respectively open toward the first and second upstream ducts 311 and 321 and second openings H2 respectively open toward the first and second downstream ducts 313 and 323. In this manner, the first and second filters 331 and 332 respectively disposed in the first and second frames 3331 and 3332 may connect the first and second upstream ducts 311 and 321 with the first and second downstream ducts 313 and 323, respectively.

The first and second filters 331 and 332 may be connected to first openings H1 of the first and second frames 3331 and 3332, respectively, and the first openings H1 of the first and second frames 3331 and 3332, may be connected to the first and second upstream ducts 311 and 321, respectively. Therefore, the first and second filters 331 and 332 may filter air introduced through the first openings H1 of the first and second frames 3331 and 3332, respectively.

In addition, the second openings H2 of the first and second frames 3331 and 3332 may be connected to the first and second downstream ducts 313 and 323, respectively. Therefore, air past through the first and second filters 331 and 332 may be introduced to the first and second downstream ducts 313 and 323 through the second openings H2 of the first and second frames 3331 and 3332, respectively.

The first and second filters 331 and 332 may be inserted into the first and second filter receptacles 312 and 322 through the first and second frames 3331 and 3332, respectively, and may thus be connected to the first and second upstream ducts 311 and 321, respectively.

In this manner, the first and second filters 331 and 332 may filter the air introduced from the first and second upstream ducts 311 and 321 to the first and second filter receptacles 312 and 322.

For example, the first and second filters 331 and 332 may be pre-filters including fine through holes, through which air is allowed to pass but the contaminants such as dust or lint in the air are not allowed to pass.

However, the first and second filters 331 and 332 may be configured of various types of filters capable of filtering the contaminants in the air past through the first and second filter receptacles 312 and 322 and moved to the first and second downstream ducts 313 and 323, and may have various structures depending on structures of the first and second filter receptacles 312 and 322.

The first and second openings 312H and 322H of the first and second filter receptacles 312 and 322 may be open in the same direction, and thus the first and second filters 331 and 332 may be inserted in the same direction.

The first and second openings 312H and 322H may have shapes corresponding to shapes of the first and second frames 3331 and 3332.

As shown in FIG. 6, the first and second openings 312H and 322H may be open toward the front side of the main body 101, and the filter tray receptacle 101S connected to the first and second openings 312H and 322H may also be open toward the front side of the main body 101.

Accordingly, the filter tray 333 may be coupled to the main body 101 by being inserted from the front side of the main body 101 into the filter tray receptacle 101S, and also partially form the appearance of the main body 101 by being inserted into the filter tray receptacle 101S.

In addition, the filter tray 333 may be coupled to the main body 101 and close the first and second openings 312H and 322H.

In detail, the gripper 3330 is coupled to the filter tray receptacle 101S by inserting the filter tray 333 into the filter tray receptacle 101S, and the first and second frames 3331 and 3332 may be inserted and coupled to the first and second filter receptacles 312 and 322 through the first and second openings 312H and 322H, respectively.

In this manner, the first and second filters 331 and 332 may be inserted into the first and second filter receptacles 312 and 322 to be connected to the first and second upstream ducts 311 and 321, respectively.

Accordingly, the hot air of the first and second drying chambers 10S and 20S may be filtered by passing through the first and second filters 331 and 332 disposed in the first and second filter receptacles 312 and 322, respectively, without leaking to the outside.

The air past through the first and second filters 331 and 332 may be moved along the first and second downstream ducts 313 and 323 connected to the first and second filter receptacles 312 and 322, respectively, and may be exhausted the outside of the main body 101 through the exhaust port 101H.

The gripper 3330 may be formed to be easily gripped by the user, and formed in a shape to have its outer surface smoothly connected to the front surface of the main body 101 to partially form the appearance of the main body in a state of being inserted into the filter tray receptacle 101S.

Therefore, the user may couple the filter tray 333 to the filter tray receptacle 101S, or to easily detach the filter tray 333 coupled to the filter tray receptacle 101S, by gripping the gripper 3330.

As described above, the first and second filter receptacles 312 and 322 may be disposed close to each other, and open equally toward the front side of the main body 101 to be connected to the filter tray receptacle 101S formed on front surface of the main body 101.

Therefore, the filter tray 333 may be coupled to the filter tray receptacle 101S, and accordingly the first and second filters 331 and 332 may be easily coupled to the first and second filter receptacles 312 and 322 simultaneously.

In addition, the first and second filters 331 and 332 may be disposed together in the filter tray 333. Therefore, the first and second filters 331 and 332 may be detached from the first and second filter receptacles 312 and 322 simultaneously by detaching the filter tray 333 from the filter tray receptacle 101S.

Therefore, by detaching the filter tray 333 from the main body 101, the first and second filters 331 and 332 may be cleaned or replaced simultaneously.

As such, in the dryer 1 according to an embodiment of the disclosure, the first and second filter receptacles 312 and 322 disposed on the first and second exhaust paths 31 and 32, respectively, may be disposed close to each other, and the first and second filters 331 and 332 may be disposed in the single filter tray 333. Due to this configuration, the first and second filters 331 and 332 may be coupled to or detached from the first and second exhaust paths 31 and 32 simultaneously.

In this manner, the user may simultaneously replace or clean the first and second filters 331 and 332 which filter the air passing through the first and second exhaust paths 31 and 32, thereby improving convenience of management of the first and second filters 331 and 332.

In addition, the first and second filter receptacles 312 and 322 may be disposed close to the front surface of the main body 101, and the filter tray 333 may be coupled to the main body 101 through the filter tray receptacle 101S formed on the front surface of the main body 101. Therefore, the user may easily couple/detach the filter tray 333 to/from the filter tray receptacle 101S by gripping the gripper 3330.

Figure 7:
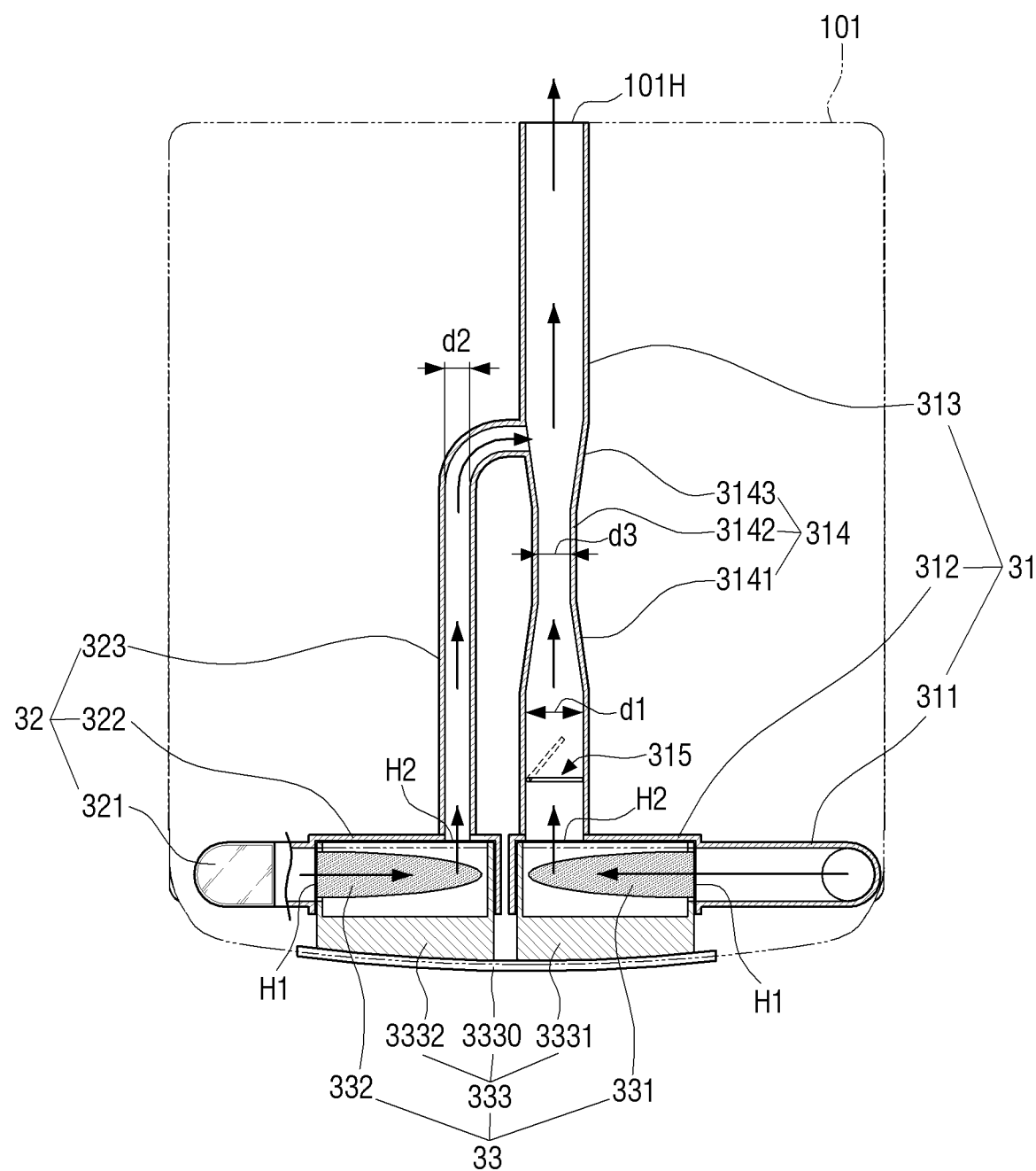
FIG. 7 is a plan view showing the exhaust unit disposed inside the dryer according to an embodiment of the disclosure.

FIG. 7 is a plan view showing the inside of the dryer 1 according to an embodiment of the disclosure centered on the exhaust unit 30.

Hereinafter, the description focuses on a structure in which the first exhaust path 31 and the second exhaust path 32 are connected to each other.

As shown in FIG. 7, the first exhaust path 31 may include a venturi tube 314.

In detail, the venturi tube 314 may be disposed in the first downstream duct 313 to partially form the first downstream duct 313.

In addition, the second downstream duct 323 may be connected to the venturi tube 314, and thus the air of the second drying chamber 20S may be moved from the second downstream duct 323 to the venturi tube 314.

The first drying chamber 10S may be larger in size than the second drying chamber 20S, and therefore the diameter of the first exhaust path 31 may be larger than that of the second exhaust path 32.

For example, as shown in FIG. 7, a diameter d1 of the first downstream duct 313 may be larger than a diameter d2 of the second downstream duct 323.

In addition, the venturi tube 314 may include: a first portion 3141 connected with an upstream portion of the first downstream duct 313, which is close to the first filter receptacle 312, and including a diameter gradually decreased from the diameter d1 of the first downstream duct 313; a second portion 3142 connected to the first portion 3141; and a third portion 3143 connected to the second portion 3142 and including a diameter gradually increased from a diameter of the second portion 3142 to the diameter d1 of the first downstream duct 313.

The diameter d3 of the second portion 3142 may be smaller than the diameter d1 of the first downstream duct 313.

In addition, the second exhaust path 32 may be connected to the third portion 3143 of the venturi tube 314, and in detail, the second downstream duct 323 may be connected to the third portion 3143 of the venturi tube 314.

The air past through the first filter receptacle 312 and moved along the first downstream duct 313 may have an increased speed as passing through the venturi tube 314.

Accordingly, air inside the second downstream duct 323 connected to the venturi tube 314 may be sucked into the venturi tube 314.

In detail, the air past through the upstream portion of the first downstream duct 313 and moved to the first portion 3141 of the venturi tube 314 may have the increased speed as pressure is decreased as the air passes through the second portion 3142.

Therefore, the air inside the second downstream duct 323 connected to the third portion 3143 of the venturi tube 314 may be sucked into the third portion 3143 by a flow of the air inside the first downstream duct 313 which has the increased speed as passing through the second portion 3142.

In this manner, the air past through the first exhaust path 31 may not flow back into the second exhaust path 32, and the air of the second drying chamber 20S moved along the second exhaust path 32 may not flow back into the second drying chamber 20S and easily enter the first exhaust path 31 and be exhausted through the exhaust port 101H.

In addition, the first exhaust path 31 may include a damper 315 disposed upstream of the first exhaust path 31 than the venturi tube 314 to selectively open and close the first exhaust path 31.

In detail, the damper 315 may be disposed between the venturi tube 314 and the first filter receptacle 312 in the first downstream duct 313.

In addition, the damper 315 may be a check damper 315 opened in only one direction from the first drying chamber 10S toward the exhaust port 101H by being pressurized by the air moved from the first drying chamber 10S toward the exhaust port 101H to prevent the air moved along the first exhaust path 31 from flowing back to the first drying chamber 10S.

In detail, the damper 315 may be configured as a check damper 315 opened and closed only in one direction from the first filter receptacle 312 toward the exhaust port 101H to prevent the air moved along the first downstream duct 313 toward the exhaust port 101H from flowing back to the first drying chamber 10S.

In addition, the damper 315 may be pressurized by the air moved from the first filter receptacle 312 toward the exhaust port 101H even without obtaining any separate driving force for its opening and closing, and thus be opened and closed in one direction from the first filter receptacle 312 toward the exhaust port 101H.

Therefore, in case that the drying is performed only in the first drying chamber 10S, the air after the drying in the first drying chamber 10S may be guided to the exhaust port 101H through the first exhaust path 31, and the damper 315 may be opened as the air of the first drying chamber 10S is moved along the first exhaust path 31.

In addition, the diameter d2 of the second exhaust path 32 may be smaller than the diameter d1 of the first exhaust path 31, and the second exhaust path 32 may be connected to the third portion 3143 of the venturi tube 314. Therefore, in case that the drying is performed only in the first drying chamber 10S, the air passing through the first exhaust path 31 may be prevented from flowing back to the second exhaust path 32.

In addition, in case that the drying is performed only in the second drying chamber 20S, the air after the drying in the second drying chamber 20S may be introduced to the third portion 3143 of the venturi tube 314 through the second exhaust path 32 and be exhausted along the first downstream duct 313 to the exhaust port 101H.

Here, even in case that the air of the second drying chamber 20S introduced to the third portion 3143 of the venturi tube 314 is moved toward the first filter receptacle 312, the damper 315 opened only in one direction may be closed to prevent the air of the second drying chamber 20S from flowing back to the first filter receptacle 312.

In addition, in case that the drying is performed simultaneously in the first and second drying chambers 10S and 20S, the damper 315 may be opened as the air of the first drying chamber 10S is exhausted along the first exhaust path 31 to the exhaust port 101H, and the air after the drying in the second drying chamber 20S may be introduced to the third portion 3143 of the venturi tube 314 through the second exhaust path 32 to be exhausted along the first downstream duct 313 to the exhaust port 101H.

As such, the first exhaust path 31 described above may include the venturi tube 314 and the damper 315, and the second exhaust path 32 may be connected to the venturi tube 314. Even by such simple configuration and structure, the humid air of the first and second drying chambers 10S and 20S may easily be exhausted through the single exhaust port 101H without flowing back into the first and second drying chambers 10S and 20S.

Although the diverse embodiments of the disclosure are individually described hereinabove, the respective embodiments are not necessarily implemented singly, and may also be implemented to combine configurations and operations thereof with those of one or more other embodiments.

In addition, although the embodiments of the disclosure are illustrated and described hereinabove, the disclosure is not limited to the above-mentioned specific embodiments, but may be variously modified by those skilled in the art to which the disclosure pertains without departing from the scope and spirit of the disclosure as disclosed in the accompanying claims. These modifications also need to be understood to fall within the scope of the disclosure.

The invention claimed is:

1. A dryer comprising:
a main body including an exhaust port;
a first drying chamber disposed inside the main body and supplied with hot air;
a second drying chamber disposed inside the main body and supplied with hot air; and
an exhaust unit configured to guide air inside the first and second drying chambers to the exhaust port, wherein the exhaust unit includes:
a first exhaust path for connecting the first drying chamber with the exhaust port,
a second exhaust path for connecting the second drying chamber with the first exhaust path, and
a filter assembly detachably coupled to the main body and configured to filter air passing through the first and second exhaust paths,
wherein the first exhaust path includes a first filter receptacle and the second exhaust path includes a second filter receptacle,
wherein the filter assembly includes a filter tray for disposing a first filter and a second filter together,
wherein the first filter and the second filter are coupled to or detached from the first and second receptacles simultaneously as the filter tray is coupled to or detached from the main body,
wherein the first drying chamber is larger than the second drying chamber, and a diameter of the first exhaust path is larger than that of the second exhaust path, and
wherein the first exhaust path includes a venturi tube, and the second exhaust path is connected to the venturi tube.

2. The dryer as claimed in claim 1, wherein
the first filter receptacle includes a first opening open to insert the first filter thereinto, and
the second filter receptacle includes a second opening open to insert the second filter thereinto.

3. The dryer as claimed in claim 2, wherein the main body includes a filter tray receptacle connected to the first and second openings and open to insert the filter tray thereinto.

4. The dryer as claimed in claim 3, wherein
the first and second openings are open in the same direction, and
the filter tray is coupled to the main body and closes the first and second openings.

5. The dryer as claimed in claim 4, wherein
the filter tray includes a gripper detachably coupled to the filter tray receptacle and first and second frames coupled to the gripper and configured to support the first and second filters, respectively, and
in case that the filter tray is coupled to the main body, the first and second frames are inserted to the first and second filter receptacles through the first and second openings, respectively.

6. The dryer as claimed in claim 5, wherein
the first exhaust path includes a first upstream duct for connecting an outlet of the first drying chamber with the first filter receptacle and a first downstream duct for connecting the first filter receptacle with the exhaust port,
the second exhaust path includes a second upstream duct for connecting an outlet of the second drying chamber with the second filter receptacle and a second downstream duct for connecting the second filter receptacle with the first downstream duct, and
the first and second filters are inserted into the first and second filter receptacles, respectively, to be connected to the first and second upstream ducts, respectively.

7. The dryer as claimed in claim 6, wherein the first and second filter receptacles and the first and second downstream ducts are disposed between the first drying chamber and the second drying chamber.

8. The dryer as claimed in claim 7, wherein
the first and second filter receptacles are disposed on a front surface of the main body, and
the filter tray receptacle is open toward a front side of the main body.

9. The dryer as claimed in claim 1, wherein
the venturi tube includes a first portion including a gradually decreased diameter, a second portion connected to the first portion and a third portion including a diameter gradually increased from a diameter of the second portion, and
the second exhaust path is connected to the third portion.

10. The dryer as claimed in claim 1, wherein the first exhaust path includes a damper disposed upstream of the first exhaust path than the venturi tube to selectively open and close the first exhaust path.

11. The dryer as claimed in claim 2, wherein the first and second filter receptacles are disposed upstream than a portion where the first exhaust path and the second exhaust path are connected to each other.

* * * * *